United States Patent [19]

Fukasawa et al.

[11] 4,218,726
[45] Aug. 19, 1980

[54] INDICATOR GAUGE WITH ILLUMINATED POINTER

[75] Inventors: Noburu Fukasawa, Kamakura; Masao Ishikawa, Yokohama, both of Japan

[73] Assignee: Nissan Motor Company, Limited, Yokohama, Japan

[21] Appl. No.: 957,761

[22] Filed: Nov. 6, 1978

[30] Foreign Application Priority Data

Nov. 9, 1977 [JP] Japan ................................. 52/134945

[51] Int. Cl.² ........................ G01D 11/28; B60Q 1/26; F21V 7/04
[52] U.S. Cl. ........................................ 362/23; 362/26; 362/31; 362/32; 116/48; 116/288
[58] Field of Search ........................ 362/23, 26, 29, 30, 362/31, 32; 116/48, 49, 54, 62.1, 288

[56] References Cited

U.S. PATENT DOCUMENTS

| 3,033,155 | 5/1962 | Beckman | 116/288 |
| 3,129,691 | 4/1964 | Walker | 362/26 |

Primary Examiner—Samuel W. Engle
Assistant Examiner—Donald P. Walsh
Attorney, Agent, or Firm—Schwartz, Jeffery, Schwaab, Mack, Blumenthal & Koch

[57] ABSTRACT

A first light reflecting surface is formed at either the back side of a hub section of a transparent pointer or an hole formed in a transparent dial board and a second light reflecting surface is formed on a front side of the hub section of the pointer. Light rays transmitting entirely within the dial board in a direction parallel to the longer dimensions of the dial board are reflected toward the second light reflecting surface by the first light reflecting surface and then reflected toward the pointing section of the pointer by the second light reflecting surface to illuminate the pointer.

21 Claims, 8 Drawing Figures

INDICATOR GAUGE WITH ILLUMINATED POINTER

FIELD OF THE INVENTION

The present invention relates in general to an illuminated indicator gauge, such as speedometer and tachometer used in a motor vehicle, and more particularly to such a gauge having an illuminated pointer.

BACKGROUND OF THE INVENTION

Since many indicator gauges are used in surroundings which receive very little light, either naturally or artificially, various arrangements have been made to illuminate such gauges so that they can be easily read. Such gauges are generally provided with their own light source for the purpose of the above. Many types of gauges are such constructed that light rays from the light source are directed from radial outside of the dial board to illuminate the indicia of the dial board and the position of the indicator pointer.

In such a conventional indicator gauge, however, the following drawbacks will be encountered especially on the pointer. First, illumination on the pointer changes considerably in accordance with changes of the angular position of the pointer with respect to the dial board. If elimination of this drawback is necessary, a great number of light sources must be arranged around the dial board. Second, generally same illumination effects will occur on the pointer and the dial board because of using common light rays. This will limit the reliability of sure distinction of the pointer from its background that is the face of the dial board. These drawbacks will cause difficulties to arise in clearly and quickly reading the dial.

SUMMARY OF THE INVENTION

Thus, elimination of the above-mentioned drawbacks is an essential object of the invention.

It is an object of the present invention to provide an illuminated indicator gauge which has a transparent indicator pointer through which light rays pass to illuminate the pointer.

According to the present invention, there is provided an illuminated indicator gauge having a spindle of a movement, comprising a dial board of a transparent material arranged to be perpendicular to the spindle and formed with a through hole through which the spindle spacedly passes; illuminating means located at the periphery of the dial board such that the light rays from the illuminating means are transmitted entirely within the transparent material of the dial board in a direction which is towards the through hole and which is parallel to the longer dimensions of the dial board; an indicator pointer of a transparent material including a hub section fixed to the spindle and an elongate pointing section radially outwardly extending from the hub section whereby the pointer moves over the face of the dial board in response to rotation of the spindle about the axis of the spindle, the hub section being formed with a front section from which the pointing section extends and a rear section which is located adjacent the through hole of the dial board; first light reflecting means located in the vicinity of the through hole of the dial board for reflecting the light rays, which come through the dial board from the illuminating means, toward the front section of the hub section; and second light reflecting means formed on the front section for reflecting the light rays from the first light reflecting means toward the pointing section of the pointer, wherein the second light reflecting means is a curved surface which is shaped and disposed to have at least one focus within an area of the indicator pointer, the area extending from the joint section of the hub section and the pointing section to a free end of the pointing section, the free end being disposed opposite the joint section.

SUMMARY OF THE DRAWINGS

Other objects and advantages of the invention will become apparent from the following description when taken in conjunction with the accompanying drawings, in which.

DESCRIPTION OF THE EMBODIMENTS

Figure 1:
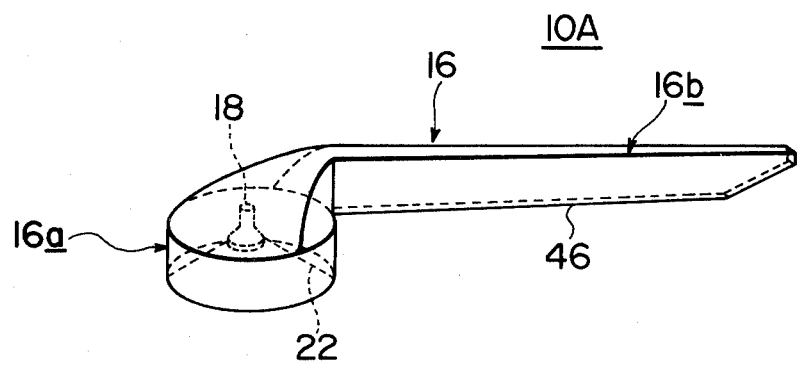
FIG. 1 is a perspective view of an indicator pointer used in the illuminated indicator gauge according to the invention.
Figure 2:
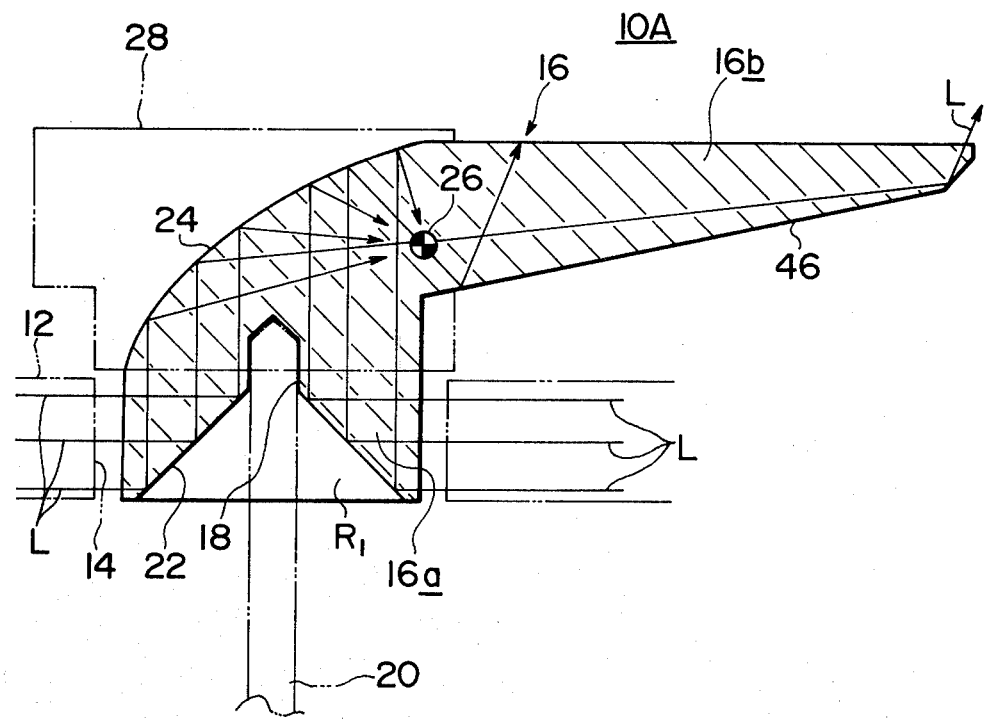
FIGS. 2 to 8 are sectional views of first to seventh embodiments of the illuminated indicator gauge of the invention.

FIGS. 1 and 2, especially FIG. 2 illustrate the first embodiment of an illuminated indicator gauge according to the invention and is generally designated by numeral 10A. The indicator gauge 10A comprises a dial board 12 constructed of transparent material such as acryl resin and/or polycarbonate resin. The indicia or graduation is marked on one face of the board 12, that is, an upper face of the same in the drawing. The dial board 12 is formed at a suitable position thereof with a circular opening 14 for spacedly receiving therein a cylindrical hub section 16a of an indicator pointer 16 the construction and configuration of which will be described hereinnext.

The indicator pointer 16 is made of transparent material and comprises, as is seen from FIG. 2, the cylindrical hub section 16a and an elongate pointing section 16b which radially outwardly extends from the hub section 16a. The cylindrical hub section 16a is formed with a central blind bore 18 into which a leading end of a spindle 20 is tightly disposed. The spindle 20 is arranged to be substantially perpendicular to the face of the dial board 12 so that the pointing 16, more specifically, the pointing section 16b can swingably move over the face of the dial board 12 while keeping a predetermined distance therebetween in response to rotation of the spindle 20 about the axis thereof. Although not shown in the drawing, the spindle 20 is operatively connected to a movement mounted on the back side of of the gauge 10A.

As is shown in the drawings, the cylindrical hub section 16a is formed at its rear section with a frustoconical recess $R_1$ which is merged and coaxial with the central blind bore 18 with an apex thereof pointing in the direction of a front surface of the hub section 16a. It is to be noted that the depth of the recess $R_1$ is substantially same as the thickness of the dial board 12. The inclination angle of the frusto-conical surface 22 of the recess $R_1$ with respect to the axis of the recess $R_1$ (which is the axis of the spindle 20) is approximately 45 degrees so that the frusto-conical surface 22 forms a first light reflecting surface which functions to reflect light rays (L) coming through the dial board 12 toward the front section of the hub section 16a of the pointer 16.

The cylindrical hub section 16a is formed at its front section with a second light reflecting surface 24. As shown, the second light reflecting surface 24 is sized and positioned to sufficiently cover the recess R₁ and is constructed to form a spheroidal surface having a focus 26 at the connecting or joint section of the pointing section 16b to the hub section 16a.

Although not shown in the drawing, a suitable number of light sources is arranged around the periphery of the dial board 12 so that light rays from the sources are transmitted entirely within the dial board in a direction which is towards the recess R₁ and which is parallel to the face of the dial board 12, that is in a manner as is indicated by the lines "L". The number of the light sources is selected in accordance with the angular range within which the pointer 16 swings.

Indicated by a phantom line 28 is a cap which is disposed on the hub section 16a of the pointer 16. Usually, the cap 28 acts as a balancer of the pointer 16 to achieve the balanced rotation or swing of the pointer 16.

With the above, when the light sources are energized to light, the light rays from the sources pass through the dial board 12 and enter the hub section 16a of the pointer 16 from the cylindrical outer surface of the same and are then reflected outwardly in this drawing at the frusto-conical surface 22 of the recess R₁ and then reflected rightwardly in the drawing, that is toward the focus 26, at the spheroidal surface 24 of the pointer 16, in a manner as is indicated by lines "L". Thus, the pointing section 16a of the pointer 16 is illuminated to be easily noticed.

Figure 3:
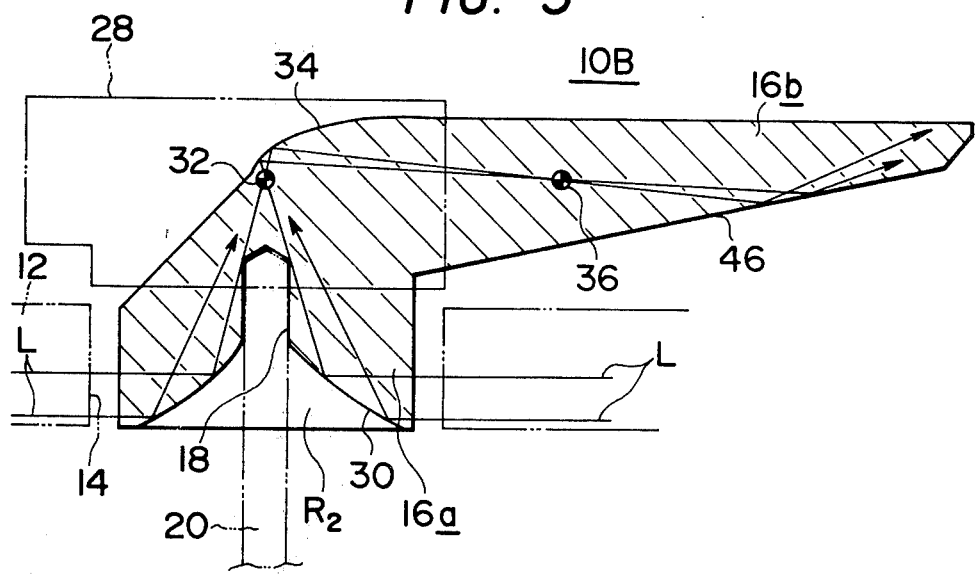

Referring to FIG. 3, there is illustrated a second embodiment of the invention, which is designated by numeral 10B. For the facilitation of reading the drawings and description, parts similar to those of the first embodiment will be denoted by the same numerals as in FIG. 2 and the detailed explanation of which will be omitted from the following. In the second embodiment, the cylindrial hub section 16a of the pointer 16 is formed at its rear section with a frusto-conical recess R₂ which is coaxial with the central blind bore 18. The frusto-conical surface 30 defining the recess R₂ is constructed to form a spheroidal surface which has its focus 32 in the hub section 16a on the axis of the spindle 20 at the position near the upper surface of the hub section 16a as shown. The surface acts as the first light reflecting surface. The upper surface is formed, on a section covering the focus 32, with another spheroidal surface 34 acting as the second light reflecting surface. The surface 34 is constructed to have two focuses (32) and 36 one of which is located at the focus 32 of the recess R₂ and the other of which is located in a substantially middle section of the pointing section 16b of the pointer, as shown.

Thus, the light rays entering the hub section 16a are reflected upwardly toward the focus 32 at the curved surface 30 of the recess R₂ and reflected toward the focus 36 at the spheroidal surface 34 in a manner as is indicated by the lines "L". Thus, the pointing section 16b is effectively illuminated to be easily noticed.

Figure 4:
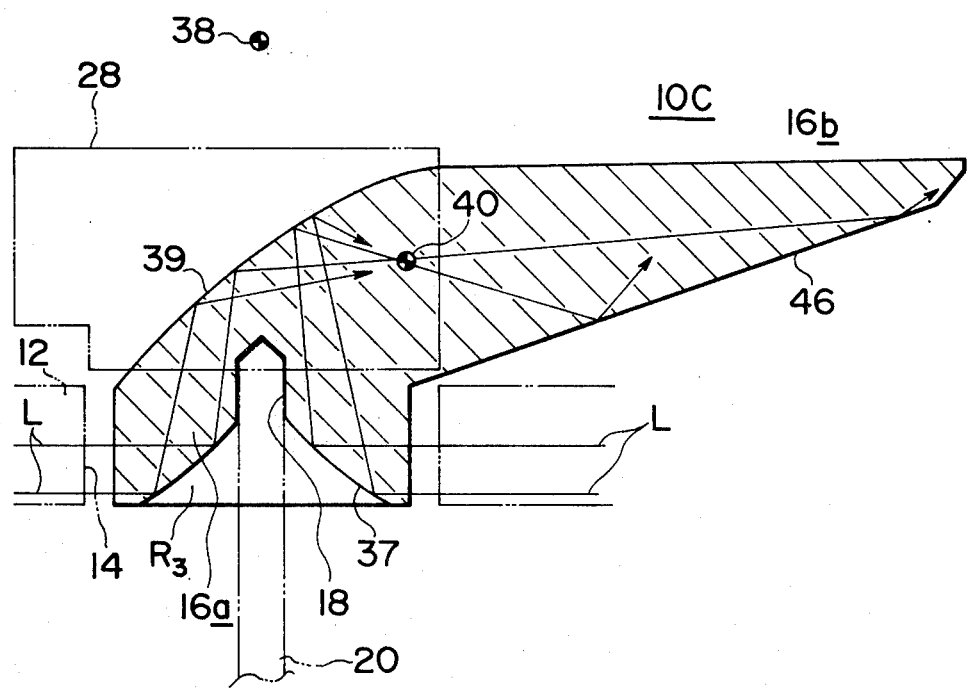

Referring to FIG. 4 of the drawings, there is illustrated the third embodiment of the present invention and is generally designated by numeral 10C. In the third embodiment, the conical recess R₃ coaxial with the blind bore 18 is formed to have a conical surface 37 (first light reflecting surface) which has its focus 38 on the axis of the spindle 20 away from the cylindrical hub section 16a, as shown. The upper surface of the hub section 16a is formed with a part of hyperbolic surface 39 (second light reflecting surface) which has two focuses (38) and 40 one of which is located at the focus 38 of the recess R₃ and the other of which is located at the connecting section of the pointing section 16b with the hub section 16a, as shown.

The light rays passing through the dial board 12 will travel in the pointer 16, in a manner as is indicated by the lines "L", to effectively illuminate the pointing section 16b.

Figure 5:
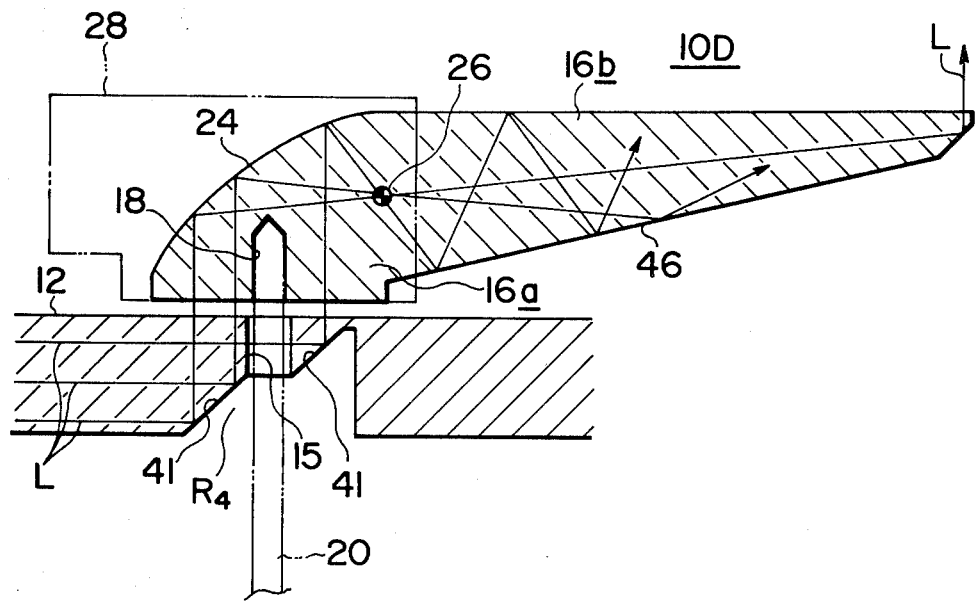
Figure 6:
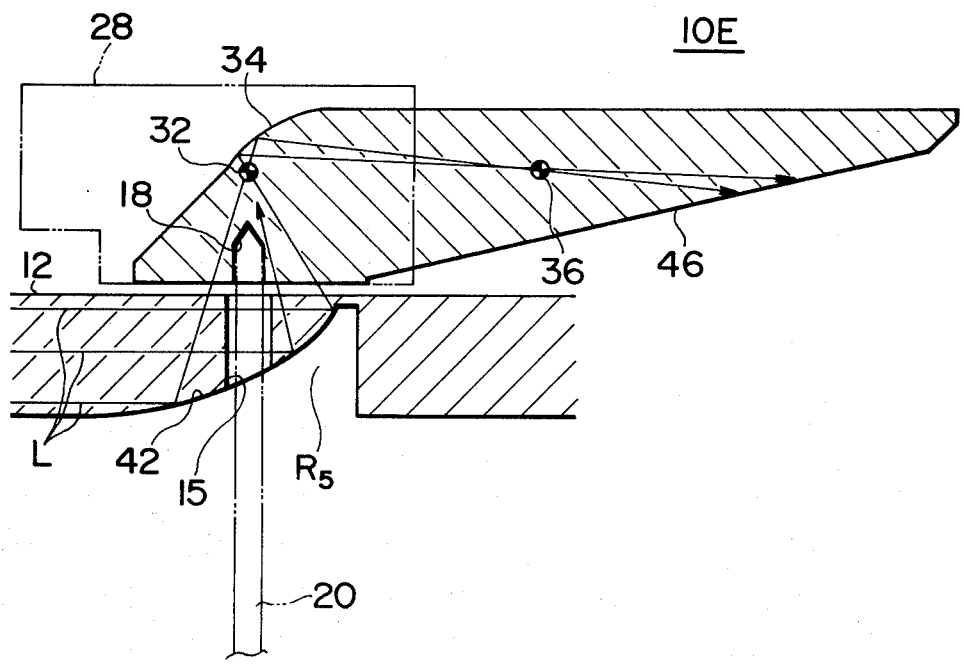
Figure 7:
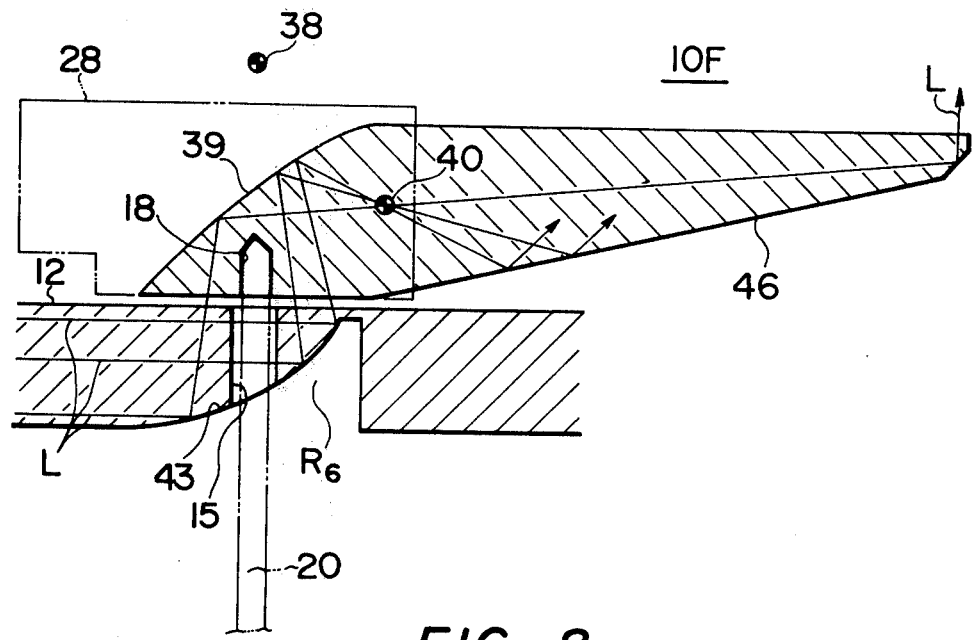

Referring to FIGS. 5, 6 and 7, there are illustrated fourth, fifth and sixth embodiments of the invention and are generally designated by numerals 10D, 10E and 10F respectively. In these embodiments, the entire body of the pointer 16 is located above the dial board 12, and the first light reflecting surface is formed in the dial board 12, not in the pointer 16. Thus, there is no necessity of providing such large circular opening 14 in the dial board 12 as in the first, second and third embodiments. More specifically, in the fourth, fifth and sixth embodiments, it is sufficient to provide the dial board 12 with a circular opening 15 the diameter of which is slightly larger than that of the spindle 20 as will be understood from the corresponding drawings.

In FIG. 5, the fourth embodiment 10D is shown. As shown, the dial board 12 is formed with a recess R₄ merged with the circular opening 15. The recess R₄ is provided with inclined flat surfaces 41 (first light reflecting surface) at its one side from which the circular opening 15 extends. These flat surfaces 41 are inclined at approximately 45 degrees with respect to the axis of the spindle 20. The upper surface 24 of the hub section 16a is shaped to have substantially the same form as in the second light reflecting surface of the first embodiment 10A mentioned before. The light rays passing through the left section of the dial board 12 are reflected upwardly at the inclined flat surfaces 41 and then reflected toward the focus 26 at the reflecting surface 24 to illuminate the pointer part 16b, in a manner as is indicated by the lines "L".

In FIG. 6, the fifth embodiment 10E is illustrated. In this case, the recess R₅ of the dial board 12 is formed with a spheroidal surface 42 which has its focus 32 in the hub section 16a on the axis of the spindle 20 in the vicinity of the upper surface of the hub section 16a. The upper surface of the hub section 16a is formed with another spheroidal surface 34. The surface 34 is constructed to have two focuses (32) and 36 one of which is positioned at the focus 32 of the spheroidal surface of the recess R₅ and the other of which is located in the substantially middle section of the pointing section 16b of the pointer 16, as shown. Thus, the light rays run in the dial board 12 and the pointer 16 in a manner as is illustrated by the lines "L", that is, a similar manner as in the before-mentioned second embodiment.

In FIG. 7, the sixth embodiment 10F is shown. In this case, the recess R₆ in the dial board 12 is formed with a spheroidal surface 43 which has its focus 38 on the axis of the spindle 20 away from the hub section 16a of the pointer 16. The upper surface of the hub section 16a is formed with a part of the hyperbolic surface 39 which has two focuses (38) and 40 one of which is positioned at the focus 38 and the other of which is located at the connecting section of the pointing section 16b with the hub section 16a. Thus, the light rays from the left positioned light sources run in the dial board 12 and the pointer 16 in such a manner as indicated by the lines "L", that is, a similar manner to the before-mentioned third embodiment.

Figure 8:
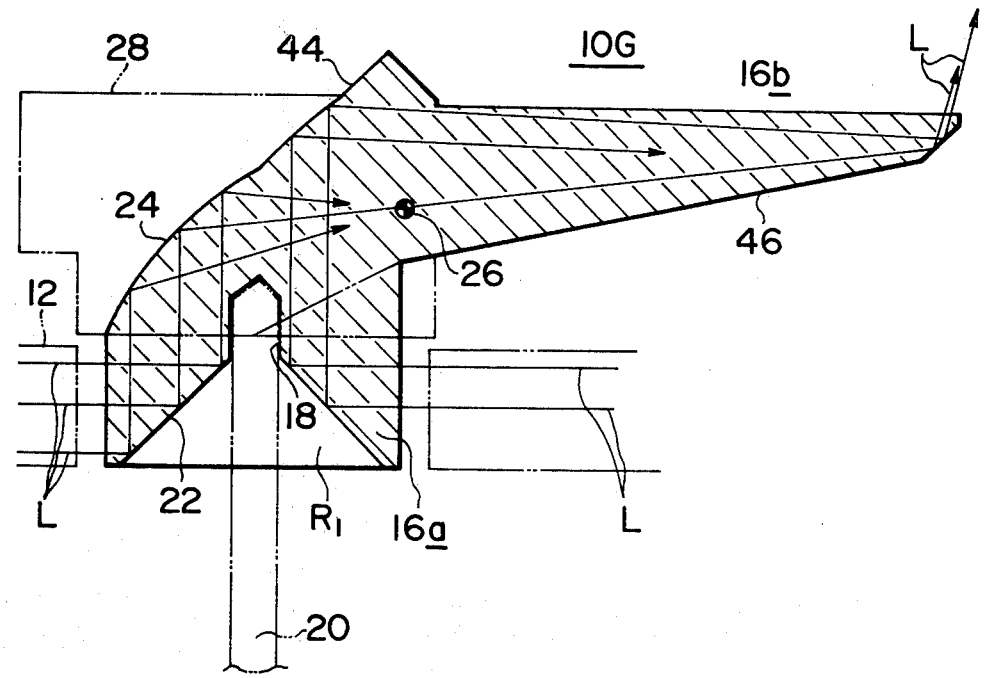

Referring to FIG. 8, there is illustrated a seventh embodiment 10G which is a slight modification of the first embodiment 10A mentioned before. In this seventh embodiment, the upper surface of the hub section 16a consists of a flat surface 44 and the spheroidal surface 24. The inclination angle of the flat surface 44 with respect to the axis of the spindle 20 is approximately 45 degrees so that the leading end of the pointer part 16b is effectively illuminated.

In addition to the above, the following modifications are available in the embodiments:

In order to increase the illumination effect on the pointer part 16b, the rear surface of the pointer part 16b, which is indicated by numeral 46, may be coated with suitable reflecting materials such as white paint and/or silver paint. Furthermore, the rear surfaces 46 may be covered with a detachable light reflecting means, if desired. For the same purpose as the above, a surface of the cap 28 which faces the upper surface of the base portion 16a of the pointer 16 may be coated with suitable light reflecting material.

From the above, it will be appreciated that in the illuminated indicator gauge of the invention, the light rays from the light sources pass through the transparent dial board 12, and are reflected toward the front section of the hub section 16a of the pointer 16 at the first light reflecting surface located adjacent the circular opening 14 or 15 of the dial board 12, and then reflected toward the pointing section 16b at the second light reflecting surface formed on the front or upper surface of the hub section 16a of the pointer 16 to effectively illuminate the pointing section 16b. Thus, in accordance with the present invention, the pointer is constantly illuminated irrespective of changes in angular position of the pointer relative to the dial board. This induces that the position of the pointer is easily noticed even when the surroundings of the pointer receive very little light.

It should be noted that the foregoing description shows only seven embodiments. Various modifications are apparent to those skilled in the art without departing from the scope of the present invention which is only limited by the appended claims.

What is claimed is:

1. An illuminated indicator gauge having a spindle of a movement, comprising:
   a dial board of a transparent material arranged to be perpendicular to said spindle so that said dial board has longer dimensions in a plane generally perpendicular to said spindle, said dial board being formed with a through hole through which said spindle spacedly passes, said dial board having a periphery;
   illuminating means located at the periphery of the dial board such that the light rays from the illuminating means are transmitted entirely within the transparent material of said dial board in a direction which is towards the through hole and which is parallel to the longer dimensions of the dial board;
   an indicator pointer of a transparent material including a hub section fixed to said spindle, an elongate pointing section radially outwardly extending from said hub section and a joint section between said hub section and said pointing section, whereby said pointer moves over the face of said dial board in response to rotation of said spindle about the axis of said spindle, said hub section being formed with a front section from which said pointing section extends and a rear section which is located adjacent said through hole of said dial board said pointing section having a free end opposite said joint section;
   first light reflecting means located in the vicinity of said through hole of said dial board for reflecting the light rays, which come through said dial board from said illuminating means, toward said front section of said hub section; and
   second light reflecting means formed on said front section for reflecting the light rays from said first light reflecting means toward the pointing section of said pointer, wherein said second light reflecting means is a curved surface which is shaped and disposed to have at least one focus within an area of said indicator pointer, said area extending from the joint section of said hub section and said pointing section to a free end of said pointing section.

2. An illuminated indicator gauge as claimed in claim 1, in which said first light reflecting means is formed in said rear section of said hub section, and said rear section of said hub section is spacedly received in said through hole of said dial board.

3. An illuminated indicator gauge as claimed in claim 1, in which said first light reflecting means is formed in said dial board in the vicinity of said through hole of said dial board.

4. An illuminated indicator gauge as claimed in claim 2, in which said first light reflecting means comprises a frusto-conical surface bounding a frusto-conical recess which is formed in said rear section of the hub section with an apex of said recess pointing in the direction of said front section.

5. An illuminated indicator gauge as claimed in claim 4, in which said frusto-conical recess is coaxial with the axis of said spindle.

6. An illuminated indicator gauge as claimed in claim 5, in which the inclination angle of the frusto-conical surface of the recess with respect to the axis of said spindle is 45 degrees.

7. An illuminated indicator gauge as claimed in claim 6, in which said second light reflecting means comprises a spheroidal surface formed on said front section of said hub section with a focus located at the joint section between said pointing section and said hub section.

8. An illuminated indicator gauge as claimed in claim 7, in which the focus of said spheroidal surface of the recess is located at the front section of said hub section.

9. An illuminated indicator gauge as claimed in claim 7, in which the focus of said spheroidal surface of the recess is positioned away from said hub section.

10. An illuminated indicator gauge as claimed in claim 8, in which said second light reflecting means is a spheroidal surface formed on said front section of said hub section with two focuses thereof one of which is located at the focus of the spheroidal surface of the spheroidal recess and the other of which is located at the generally middle section of said pointing section.

11. An illuminated indicator gauge as claimed in claim 9, in which said second light reflecting means is a hyperbolic surface formed on asid front section of said hub section with two focuses thereof one of which is located at the focus of the spheroidal surface of the spheroidal recess and the other of which is located at the joint section of said pointing section with said hub section.

12. An illuminated indicator gauge as claimed in claim 3, in which said first light reflecting means is a surface partially bounding a recess which is formed in said dial board.

13. An illuminated indicator gauge as claimed in claim 12, in which said surface is inclined at 45 degrees with respect to the axis of said spindle.

14. An illuminated indicator gauge as claimed in claim 13, in which said second light reflecting means is a spheroidal surface formed on said front section of said hub section with a focus thereof located at the joint section of said pointing section to said hub section.

15. An illuminated indicator gauge as claimed in claim 12, in which said surface of said first light reflecting means is constructed to form a spheroidal surface which has its focus on the axis of said spindle.

16. An illuminated indicator gauge as claimed in claim 15, in which the focus of said spheroidal surface is positioned in the front section of said hub section.

17. An illuminated indicator gauge as claimed in claim 15, in which the focus of said spheroidal surface is positioned away from said hub section.

18. An illuminated indicator gauge as claimed in claim 16, in which said second light reflecting means comprises a spheroidal surface formed on said front section of said hub section with two focuses thereof one of which is located at the focus of a spheroidal surface of the recess of said dial board and the other of which is located at the generally middle section of said pointing section.

19. An illuminated indicator gauge as claimed in claim 17, in which said second light reflecting means is a hyperbolic surface formed on said front section of said hub section with two focuses thereof one of which is located at the focus of the recess of said dial board and the other of which is positioned at the joint section of said pointing section and said hub section.

20. An illuminated indicator gauge as claimed in claim 7, in which said second light reflecting means further comprises a flat surface formed on said front section of said hub section in the vicinity of said spheroidal surface, the inclination angle of said flat surface with respect to the axis of said spindle being 45 degrees.

21. An illuminated indicator gauge as claimed in claim 2, in which said first light reflecting means comprises a spheroidal surface bounding a spheroidal recess which is formed in said rear section of said hub section, said recess having an apex, said apex of said recess pointing in the direction of said front section.

* * * * *